(12) United States Patent
Schulz et al.

(10) Patent No.: US 6,814,684 B2
(45) Date of Patent: Nov. 9, 2004

(54) PLANETARY GEAR

(75) Inventors: Horst Schulz, Friedrichshafen (DE); Tino Kirschner, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/450,081

(22) PCT Filed: Dec. 19, 2001

(86) PCT No.: PCT/EP01/15076
§ 371 (c)(1), (2), (4) Date: Jun. 9, 2003

(87) PCT Pub. No.: WO02/052169
PCT Pub. Date: Jul. 4, 2002

(65) Prior Publication Data
US 2004/0023750 A1 Feb. 5, 2004

(30) Foreign Application Priority Data
Dec. 22, 2000 (DE) .......................... 100 64 815

(51) Int. Cl.$^7$ .......................... F16H 57/08; F16C 35/00
(52) U.S. Cl. ........................ 475/331; 384/428
(58) Field of Search .............. 475/331, 348; 384/428–444

(56) References Cited

U.S. PATENT DOCUMENTS

| 1,619,051 | A |   | 3/1927  | Asprooth et al. |         |
|-----------|---|---|---------|-----------------|---------|
| 2,882,752 | A | * | 4/1959  | Russell         | 475/204 |
| 3,009,370 | A | * | 11/1961 | Frost           | 475/300 |
| 4,091,688 | A |   | 5/1978  | Huffman         | 74/785  |
| 4,187,740 | A | * | 2/1980  | Silvestri       | 475/338 |
| 4,270,803 | A | * | 6/1981  | Baum            | 299/76  |
| 4,424,874 | A | * | 1/1984  | Koike et al.    | 180/370 |
| 5,435,793 | A | * | 7/1995  | Varela et al.   | 475/311 |
| 5,779,588 | A | * | 7/1998  | Mann et al.     | 475/331 |

FOREIGN PATENT DOCUMENTS

| DE | 196 12 144 A1   | 11/1996 | F16H/1/46  |
| DE | 199 56 789 A1   | 5/2001  | F16H/57/02 |
| EP | 0 687 836 A1    | 12/1995 | F16H/57/02 |
| WO | WO 2072380 A1 * | 9/2002  | B60K/17/04 |

* cited by examiner

Primary Examiner—Tisha Lewis
(74) Attorney, Agent, or Firm—Davis & Bujold, P.L.L.C.

(57) ABSTRACT

Proposed is a planetary drive, having a rotationally driven sun gear (2) disposed coaxially to principal drive axis (4), with a an internal gear (14) affixed within housing (12B) and possessing a rotatably supported planet carrier (22), about which a plurality of circumferentially apportioned planet gears (16) are rotatably seated, which are in complementary tooth engagement with the sun gear (2) and with the internal gear (14), whereby the planet carrier (22) forms the output drive and in common with an output side output drive shaft (24) is supported within the housing by an axially installed inclined bearing pair, comprised of a first inclined bearing (26) and a second inclined bearing (28). Further proposed is that at least the first inclined bearing (26) is affixed with its inner ring (30) in the housing (12A) and the outer ring (32) of the bearing is to rotate with the planet carrier (22) and having its pressure lines (34) forming a pressure cone, the apex (36) of which points away from the second inclined bearing (28).

12 Claims, 2 Drawing Sheets

PLANETARY GEAR

FIELD OF THE INVENTION

The invention concerns a planetary gear drive.

BACKGROUND OF THE INVENTION

Such planetary gear drives, wherein the planet carrier forms the output drive, and in common with an output side output shaft is borne by an axially set, inclined bearing pair, are adaptable for the transmission of high forces and torque moments. The drives are employed in combination with a bolt-on electric motor or, among other applications, may be integrated into automatizing technology, wherein, on the output shaft, for example, a toothed pinion or a belt pulley for toothed belts is placed. With the bearing support of the output shaft and of the planet carrier by means of an axially placed, inclined pair of bearings and by means of a corresponding preloading between the bearings, a very high structural strength and precision of the bearing system can be achieved.

In the case of the bearing support by an inclined bearing pair, a difference is defined between a so-called X-arrangement, and a so-called O arrangement of the two sets of installed bearings. In the case of the X-arrangement, pressure lines, which run through the rotating body and intersect at the axis of rotation, represent pressure cones, the apexes of which point to one another. In the case of the O-arrangement, the apexes of the pressure cones formed by the two bearings of the bearing pair point away from each other.

The X-arrangement generally offers the best solution for a simple mounting, a low outlay for construction and a minimum of supervision of design work. The reason for this is that both bearings of the inclined bearing pairs can be so mounted, with their respective inner and outer rings, such that axial contact surfaces on the components, which serve as abutments for the bearing inclines, later in operation can also pick up axial operational loadings. Hence, as a rule, no further axial securement parts for the inner and outer rings of the bearings need be provided or installed. In any case, where the X-arrangement is concerned, the bearing distance for effective bearing kinematics, as well as the separating distance of the apexes of the pressure cones, is shorter than the axial distance of the two bearings. Fundamentally, however, the greatest possible bearing distance for effective bearing kinematics is desirable, in order to achieve a high degree of loading resistance and structural strength, as well as to assure precise running of the output shaft. A drive, in which the planet carrier, which may be of one piece with the output drive shaft, is supported by a bearing pair in the X-arrangement. This, however, is not included in the non-published DE 199 56 789 A1. Because of the above discussed characteristics of the X-arrangement, with this drive, the two installed bearings are placed on both sides of the planetary gear plane, i.e., located on both sides of the planetary gear set, whereby a generally short, axial installation length of the drive is made possible.

Converse to the X-arrangement, the O-arrangement offers a bearing distance for effective bearing kinematics which is greater than is the constructed axial distance of the two bearings. The advantage therein is, that increased loading capacity and structural strength, along with a precise run of the output shaft can be attained. To install the bearings on each side of the planetary gear plane in the O-arrangement, presents, however, serious problems. Since in this case, the pressure on the inclined bearings in the directional sense of an angular movement always lies contrary to the axial directive sense of a later operational loading on the bearing there must also be clearance-free axial securement components necessary for the inner and outer bearing rings, which are difficult to install and increase the demand of the space requirements of the drive. An exact adjustment of the bearing clearance, that is, the bearing preloading at the time of the mounting, is very complex and rife with problems.

EP 0 687 836 shows a planetary drive, wherein the output shaft is supported on a bearing pair in the O-arrangement manner. In the case of this drive, both bearings of the bearing pair are next to one another, and axially disposed on the output side of the actual planetary gear. The inner rings of the two bearings are seated proximal to one another on a section of the output shaft and are loaded by a threaded nut, while axial detent surfaces on an offset housing boring abut the shoulders of the outer rings. A disadvantage of this design is the excessively large, axially, occupied space of the drive, since both bearings of the bearing pairs must be installed in the space on the output side beside the planetary set, while in the neighborhood of the input drive shaft, unused space is still available. Because of the restricted axial separating distance of the two bearings, the bearing distance for effective bearing kinematics is small, in spite of the O-arrangement.

Thus, the invention has the purpose to make available a planetary drive, in which the bearing of an axially installed, inclined bearing pair, is arranged in such a manner, that a simple mounting operation, a small construction expense, and an easily inspected construction are achieved, comparable to a gear drive, in which the bearings are placed in an X-arrangement, and whereby at the same time, a higher load capacity and structural strength and as precise a running condition is achieved as is the case with the X-arrangement.

Utilizing as a starting point, a planetary drive with the features of the principal concept of the main claim, wherein the planet carrier, in common with a output side output shaft, is seated in bearings formed by an axially placed first and a second inclined bearing pair, the purpose of the invention is achieved, in that at least the first inclined bearing pair is fixed in the housing with its inner ring, and its outer ring rotates with the planet carrier and the pressure lines of the said pair forms a pressure cone, the apex of which is pointed away from the second inclined bearing.

SUMMARY OF THE INVENTION

Where the invented planetary drive is concerned, the planet carrier can be installed in the same advantageous manner as in the case of a drive with the X-arrangement, wherein, in any case, the bearing distance for effective bearing kinematics is essentially greater.

In an advantageous embodiment of the invention, the first inclined bearing is on one side of an axial, planetary plane running through the planetary gears. The second inclined bearing is placed on the other side of the planetary gear plane. This embodiment offers a very large axial bearing distance for effective bearing kinematics within a short length of construction space.

Should very large torque moments be taken up by the output shaft, then both bearing can be so disposed, that the inner rings are affixed in the housing and the outer rings turn with the planet carrier, whereby the apexes of both pressure cones point away from each other. Thereby, the same kinematically effective bearing characteristics are achieved as are found in the O-arrangement.

However, it is often sufficient if only the first inclined bearing has its inner ring affixed in the housing and the inner ring of the second inclined bearing has its inner ring rotating in the planet carrier and its outer ring is affixed in the housing. In this case, the second inclined bearing with its pressure lines forms a pressure cone, the apex of which points toward the first inclined bearing. In this way, a parallel arrangement of the pressure cones is created, so that—with the use of the same bearings—the axial bearing distance for effective bearing kinematics is equal to the actual axial distance of the bearing.

In an embodiment of this formulation, the apexes of the pressure cones of the two inclined bearings point away from the output side of the drive, whereby a simple construction mode is achieved. In the case of an alternative embodiment the apexes of the pressure cones of the two inclined bearings point toward the output side of the drive, so that the bearing base is pushed in an advantageous manner toward the output shaft.

Since the planet carrier rotates within the housing, it is necessary to provide means, which enable the outer ring to be assigned to the planet carrier and the inner ring to the housing. In an advantageous manner, this can be done, in that the planet carrier, for the reception of the outer ring of the inclined bearing, possesses a tubular shaped extension and/or that the housing, for the reception of the inner ring, has a cylindrical projection. This said projection would be enclosed in an annular recess in the housing, which can accept this inclined bearing and at least partially, the tubular shaped extension of the planet carrier.

BRIEF DESCRIPTION OF THE DRAWINGS

The invention will now be described, by way of example, with reference to the accompanying drawings in which.

DETAILED DESCRIPTION OF THE INVENTION

Figure 1:
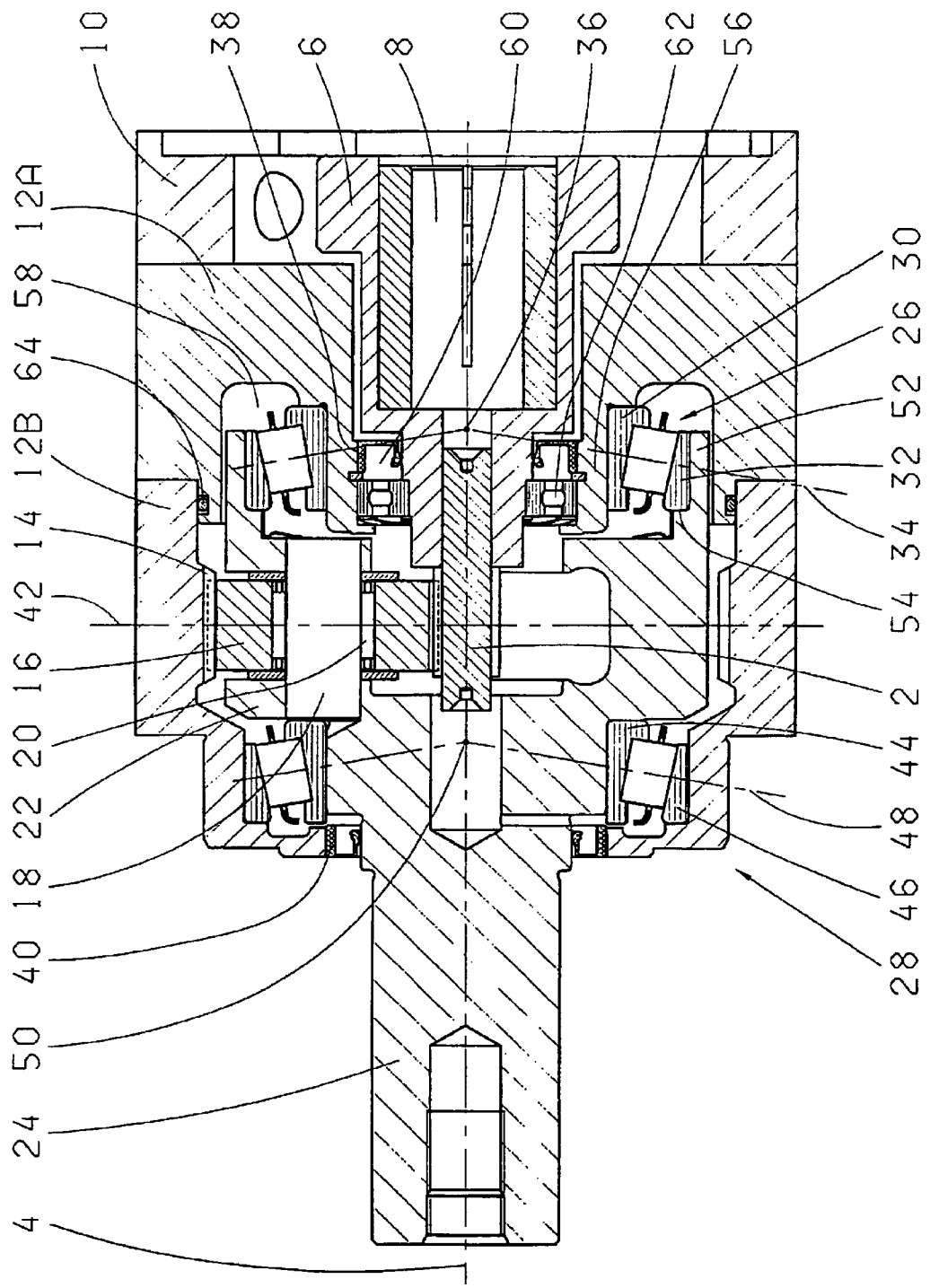
FIG. 1 is a first embodiment of an invented drive.

In FIG. 1, a sun gear, coaxial to the principal axis 4 of a drive, is designated by 2. The sun gear 2 is bound in a rotational locked manner with a sun gear shaft 6, which has a receiving zone 8 for a (not shown) motor shaft which in turn can be flange (10) connected to an (again not shown) electric motor. The housing of the planetary drive is composed of two housing parts, namely 12A and 12B. In the housing part 12B, an internal gear 14 has been machined in. A plurality of planet gears 16, of which only one is presented, are turnably set on planetary pins 18. The planetary pins 18, that is to say, the planetary gears 16, are apportioned on the circumference of a planet carrier 22 to achieve a complementary tooth engagement with the sun gear 2 and the internal gear 14. The planet carrier 22 forms the output and is constructed of one piece with the output shaft 24. The planet carrier and the output shaft could, however, also be connected by a rotarily fixed and rigid joint. The planet carrier 22, as well as the output shaft 24, by means of an axially disposed inclined bearing pair, which pair is composed of a first inclined bearing 26 and a second inclined bearing 28, secured within the housing. In the presented embodiment, tapered roller bearings are used, as these are particularly capable of carrying loads. The bearing installation could as well be carried out with inclined ball bearings or even grooved ball bearings, set in opposition to one another. Likewise, it is possible, to employ a combination of tapered roller bearings, inclined ball bearings or the grooved ball bearings. What is essential, is that the two bearings of the bearing pair be installed axially opposite to one another.

For sealing of the inner space of the drive, radial shaft sealing rings 38, 40 are provided on the input drive shaft 6 and on the output drive shaft 24.

In accord with the invention, the first inclined bearing 26 has its inner ring 30 affixed in the housing 12A and the said bearing rotates with its outer ring 32 in the planet carrier 22. In order to achieve the maximum bearing distance for effective bearing kinematics, the inclined bearing 26 is so inserted, that it forms, with its pressure lines 34 a pressure cone, the apex 36 of which is pointed away from the second inclined bearing 28.

A large axial distance of the bearing could also be gained, if the first inclined bearing 26 were located on the right side (as seen observing FIG. 1) of the planetary gear plane 42 which extends itself through the planetary gears 16, and accordingly, the second inclined bearing 28 be found on the other side of the said planetary gear plane 42. In FIG. 1 the second inclined bearing 28 is inserted in the same manner, as is the case with a gear drive of the X-arrangement. On this account, the inner ring 44 of the second inclined bearing rotates with the planet carrier 22 and the output drive shaft 24, while the outer ring 46 is affixed in the housing 12B. The pressure lines 48 of this bearing arrangement form a pressure cone, the apex of which is directed toward the first inclined bearing 26.

The bearing arrangement illustrated represents, neither an X-arrangement nor an O-arrangement, but a combination of the two. Although the pressure cones formed by the pressure lines 34, 48 point in the same direction, the two bearings 28, 26 are opposed to one another and can be preloaded.

The apexes 36, 50 of the two pressure cones are pointed away from the output side, this side being represented by the output shaft 24. The planet carrier 22 is marked by tubular shaped extension 52, which receives within it the outer ring 32 of the first inclined bearing 26, This extension is furnished with an insert 54. The housing part 12A possesses a cylindrical projection 56, which serves for the reception of inner ring 30 of the first inclined bearing 26. This projection 56 is in turn circumferentially enveloped by an annular recess 58 in the housing part 12A. This recess 58 contains the first inclined bearing 26 and at least partially holds the tubular extension 52 of the planet carrier 22.

The cylindrical projection 56 in the housing part 12A is furnished with a boring 60, which is coaxial to the main longitudinal axis 4 of the gear-drive. This boring encapsulates a ball bearing 62 for the input drive 6, which penetrates therethrough.

To ease the mounting, the housing is divided into two housing parts, namely 12A and 12B. In this combination of housing parts, the first inclined bearing 26 is seated in the first housing part 12A and the second inclined bearing 28 is in the second housing part 12B. For a sealing means between the housing parts 12A and 12BV, a circumferentially inserted sealant 64 has been provided.

The course of the mounting procedure is the same as that of a gear drive with the X-arrangement. First, the inner ring 30 of the first inclined bearing 26 is slipped onto the axial projection 56 up to its abutment. Next, the planet carrier, into which the outer ring 32 has already been inserted up to its abutment, is brought into position. The planet carrier is already also fitted with the inner ring 44 of the second inclined bearing, which ring has likewise been pressed up to the abutment on the bearing seat. In the final assembly step, the housing part 12B, with the therein installed outer ring 46 of the second inclined bearing is brought into position and is joined by bolts (not shown), is joined to the housing part 12A.

The preloading of the positioned inclined bearings 26, 28 can, at this point, be carried out in a simple manner by appropriate shims, which can be inserted against the axial end facings of the bearing inner and/or outer rings or slipped between the two housing parts 12A, 12B.

In the presented embodiment the two tapered roller bearings 26, 28 are identical. Very easily, however, these can be of different dimensioning, one from the other or the designed shapes of inclined bearings can be appropriately used.

In combination with an electric motor, which drives the sun gear 2 either directly or by means of an interposed gear stage, and which is in flanged connection with the gear housing, the above, as shown in FIG. 1, provides an easily mounted drive component of limited length for high load demands on the output shaft 24.

Figure 2:
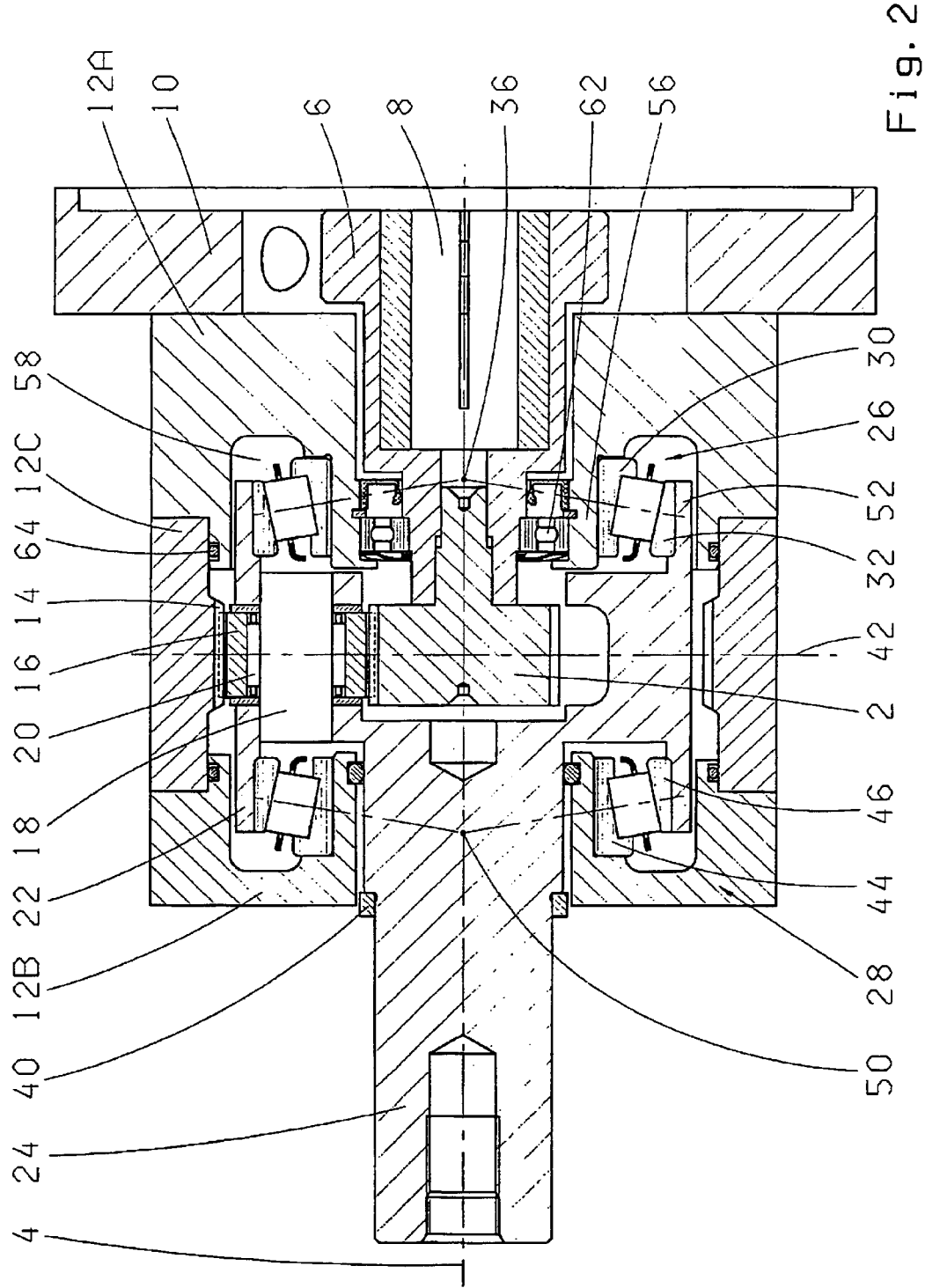
FIG. 2 is a second embodiment of an invented drive.

In FIG. 2, items in the same positions as FIG. 1 are provided with the same reference numbers. FIG. 2 shows an embodiment of the invention, in which, again, the second inclined bearing 28 has its inner ring 44 affixed in the housing 12B, while its outer ring 46 rotates with the planet carrier 22. This construction forms, with its pressure lines, a pressure cone, the apex 50 of which points away from the first bearing 26. The two inclined bearings are so placed to achieve a maximum bearing distance for effective bearing kinematics in the O-arrangement, whereby the mounting and the adjustment of the preloading can be carried out with ease equal to that of a conventional gear drive with an X-arrangement of the bearing. The housing is built from three parts. Between the housing parts 12A and 12B, which carry the two inclined bearings 26, 28, is inserted a third housing part 12C, in which the internal gear 14 has been machined.

| Reference Numbers and Associated Components | |
|---|---|
| 2 | Sun gear |
| 4 | Longitudinal principal axis of the gear drive |
| 6 | Input drive shaft |
| 8 | Recess for (not shown) motor shaft |
| 10 | Flange for (not shown) motor assembly |
| 12A | Housing part (input side) |
| 12B | Housing part (output side) |
| 12C | Housing part (center insertion, FIG. 2) |
| 14 | Internal gear |
| 16 | Planet gear |
| 18 | Planet pin |
| 20 | Planet bearing |
| 22 | Planet carrier |
| 24 | Output drive shaft |
| 26 | Inclined bearing (first inclined bearing, input side) |
| 28 | Inclined bearing (second inclined bearing, output side) |
| 30 | Inner ring for 26 |
| 32 | Outer ring for 26 |
| 34 | Pressure line (input side) |
| 36 | Apex of a cone represented by 34 |
| 38 | Sealing ring for end of input drive shaft 6 |
| 40 | Sealing ring for end of output drive shaft 4 |
| 42 | Plane through center of planetary gear, transverse to axis |

-continued

| Reference Numbers and Associated Components | |
|---|---|
| 44 | Inner ring of bearing 28, output side |
| 46 | Outer ring of bearing 28, output side |
| 48 | Pressure line (output side) |
| 50 | Apex of a cone represented by 34 |
| 52 | Extension, tubular, of planet carrier/output shaft |
| 54 | Insert against tapered bearing roller (rotatable) |
| 56 | Projection of 12A |
| 58 | Recess in 12A (annular) |
| 60 | Boring for ball bearings 62 |
| 62 | Ball bearings |
| 64 | Seal, circumferential for housing parts |

What is claimed is:

1. A planetary gear drive, having a rotationally driven sun gear (2) disposed coaxially to principal drive axis (4), with an internal gear (14) affixed within a second housing part (12B) and possessing a rotatably supported planet carrier (22) in a first housing part and the second housing part (12A, 12B), about which a plurality of circumferentially apportioned planet gears (16) are rotatably seated, the planet gears are in complementary tooth engagement with said sun gear (2) and with said internal gear (14), whereby the planet carrier (22) forms the output drive and in common with an output side output drive shaft (24) is supported within the first and second housing parts (12A, 12B) by means of an axially installed inclined bearing pair, comprised of a first inclined bearing (26) and a second inclined bearing (28) wherein at least the first inclined bearing (26) is affixed with inner ring (30) in the first housing part (12A) while an outer ring (32) rotates with the planet carrier (22) having pressure lines (34) forming a pressure cone, a first apex (36) of which points away from the second inclined bearing (28).

2. The planetary drive according to claim 1, wherein the first inclined bearing (26) is on one side of a planetary gear plane (42) extending axially through the planet gears (16) and the second inclined bearing (28) is placed on the other side of the planetary gear plane (42).

3. The planetary gear drive according to claim 1, wherein the second inclined bearing (28) has an inner ring (44) affixed within the second housing part (12B) while an outer ring (46) rotates with the planet carrier (22) and pressure lines (48) forms a pressure cone, a second apex of which (50) points away from the first inclined bearing (26).

4. The planetary gear drive according to claim 1, wherein the second inclined bearing (28) possesses an inner ring (44) which rotates with the planet carrier (22) and has an outer ring (46) which is affixed in the second housing part (12B), and with pressure lines (48) forms a pressure cone, a second apex (50) of which points to the first inclined bearing (26).

5. The planetary gear drive according to claim 4, wherein the first and second apexes (36, 50) of the pressure cones of the first and second inclined bearings (26, 28) point away from the output drive side of the planetary gear drive.

6. The planetary gear drive according to claim 4, wherein the first and second apexes (38, 50) of the pressure cones of the first and second inclined bearings (26, 28) point to the output side of said planetary gear drive.

7. The planetary gear drive according to claim 1, wherein the planet carrier (22) possesses a tubular extension (52) to receive the outer ring (32) of the inclined bearing (26).

8. The planetary gear drive according to claim 7, wherein the housing (12A) for the containment of the inner ring (30)

of the inclined bearing (26) possesses a cylindrical projection (56) which is circumferentially encapsulated by an annular recess (58) in the first housing part (12A), which in turn encloses the first inclined bearing (26) and at least partially contains the tubular projection (52) of the planet carrier (22).

9. The planetary gear drive according to claim 8, wherein the cylindrical projection (56) possesses a boring (60) coaxially disposed to the principal gear drive axis (4), which said boring contains a bearing (62) for an input drive (6) which penetrates therethrough.

10. The planetary gear drive according to claim 1, wherein the housing is a combination of at least the first and second housing parts (12A, 12B), wherein the first inclined bearing (26) is disposed in the first housing part (12A) and the second inclined bearing (28) is seated in the second housing part (12B).

11. The planetary gear drive according to claim 1, wherein the first and the second inclined bearings (26, 28) are identical.

12. The planetary gear drive according to claim 1, wherein the sun gear (2) can be driven by an electric motor, either directly, or by means of a forward interposed gearing stage and wherein the electric motor is attached by flanges to the first housing part (12A).

* * * * *